(12) United States Patent
Petter et al.

(10) Patent No.: US 8,499,774 B2
(45) Date of Patent: Aug. 6, 2013

(54) WASH PAD WITH EVACUATOR

(75) Inventors: Matthew J. Petter, South Haven, MI (US); Douglas A. Petter, South Haven, MI (US)

(73) Assignee: Petter Investments Inc., South Haven, MI (US)

( * ) Notice: Subject to any disclaimer, the term of this patent is extended or adjusted under 35 U.S.C. 154(b) by 140 days.

(21) Appl. No.: 13/078,649

(22) Filed: Apr. 1, 2011

(65) Prior Publication Data

US 2011/0253175 A1 Oct. 20, 2011

Related U.S. Application Data

(60) Provisional application No. 61/324,047, filed on Apr. 14, 2010.

(51) Int. Cl.
*B08B 3/04* (2006.01)
*B08B 3/00* (2006.01)
*B08B 9/00* (2006.01)

(52) U.S. Cl.
USPC ............ 134/123; 134/104.1; 134/104.2; 134/104.4; 134/109

(58) Field of Classification Search
USPC ........... 134/104.1, 104.2, 104.4, 109, 123
See application file for complete search history.

(56) References Cited

U.S. PATENT DOCUMENTS

| | | | |
|---|---|---|---|
| 2004/0231703 A1* | 11/2004 | McCormick et al. | 134/10 |
| 2005/0139243 A1* | 6/2005 | Hay et al. | 134/104.2 |
| 2009/0266387 A1* | 10/2009 | McCormick et al. | 134/123 |

* cited by examiner

*Primary Examiner* — Joseph L Perrin
*Assistant Examiner* — Charles W Kling
(74) *Attorney, Agent, or Firm* — Honigman Miller Schwartz and Cohn LLP

(57) ABSTRACT

A wash pad that includes a wash floor for supporting a wash item and a catch trough disposed in fluid communication with a longitudinal central portion of the wash floor. The catch trough collects at least one of wash fluid and debris from the wash floor. The wash pad also includes an evacuator disposed in fluid communication with the catch trough and an elevator disposed in fluid communication with the evacuator. The evacuator substantially removes wash fluid received from the catch trough, and the elevator elevates debris from a collection height to a dump height for dumping.

9 Claims, 20 Drawing Sheets

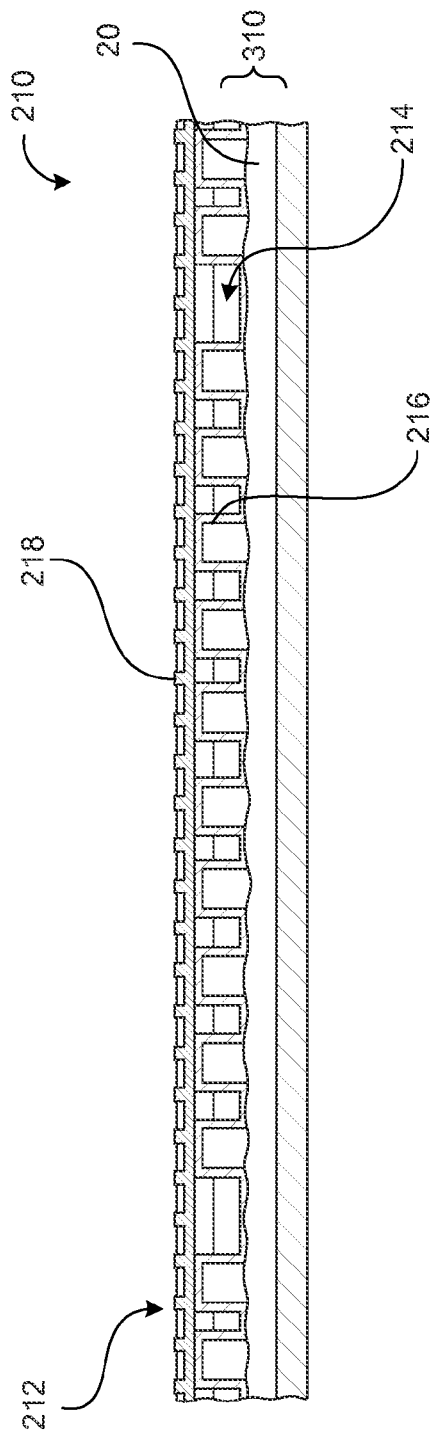
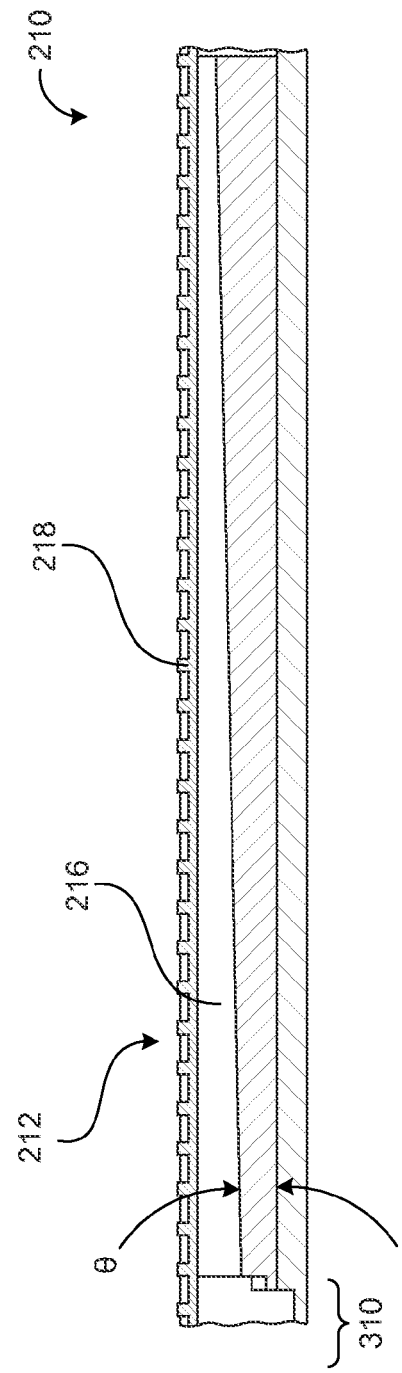

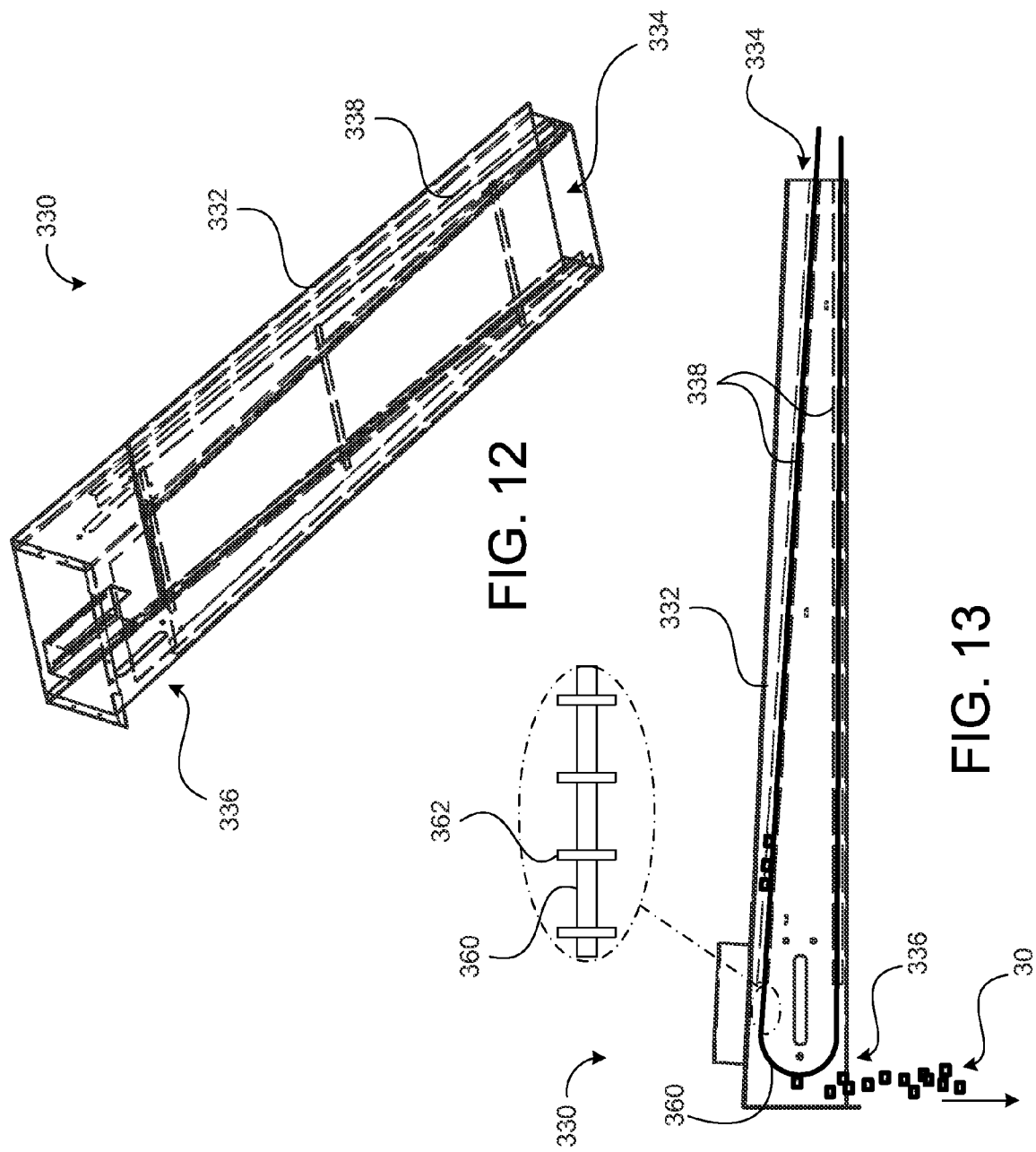

WASH PAD WITH EVACUATOR

CROSS REFERENCE TO RELATED APPLICATIONS

This U.S. patent application claims priority under 35 U.S.C. §119(e) to U.S. Provisional Application 61/324,047, filed on Apr. 14, 2010, the contents of which are hereby incorporated by reference in their entirety.

TECHNICAL FIELD

This disclosure relates to wash pads.

BACKGROUND

In general, commercial vehicles and large industrial equipment, such as forklifts, earth movers, etc., need to be cleaned from time to time to remove accumulated debris and/or contaminants. To prevent ground contamination and/or to contain the removed debris and/or contaminants, users typically use wash pads to wash the items. A wash pad typically include a platform upon which is driven a vehicle for washing. During a wash operation, a user washes the vehicle and wash fluid is collected by the platform. The wash pad may direct the wash fluid to a depository. Generally, debris can be left behind on the platform, and the user removes the remaining debris to avoid accumulation thereon. For mud, this may entail using shovels or other equipment.

SUMMARY

The disclosure provides implementations for wash pads that allow a user to wash large items and collect any used wash fluid, including any contaminants, solids, and debris therein, for treatment and/or recirculation. The wash pad includes a trough assembly that may be used to collect the wash fluid, separate debris from liquid, and raise the debris to a dumping height for dumping into a container, for example. In some implementations, the trough assembly includes a conveyer that catches wash fluid, debris or a mixture thereof collecting in a catch trough and moves the mixture to an evacuator for removal of the liquid portion. The conveyer proceeds to move any remaining portions of the mixture to a dump height for disposal (e.g., in a container). By collecting, substantially separating, and moving wash debris to a dumping location, the trough assembly significantly reduces any maintenance required by a user and aids in the removal of debris to keep the wash pad clear and clean.

One aspect of the disclosure provides a wash pad that includes a wash floor for supporting a wash item and a catch trough disposed in fluid communication with a non-peripheral portion of the wash floor. The catch trough collects at least one of wash fluid and debris from the wash floor. The wash pad also includes an evacuator disposed in fluid communication with the catch trough and an elevator disposed in fluid communication with the evacuator. The evacuator substantially removes wash fluid received from the catch trough, and the elevator elevates debris from a collection height to a dump height for dumping.

Implementations of the disclosure may include one or more of the following features. In some implementations, the wash pad includes a conveyer disposed along the catch trough and the elevator. The conveyer moves at least debris along the catch trough at the collection height and elevates the debris to the dump height for dumping. In some implementations, the wash pad includes a conveyer drive disposed at one of a dumping end of the elevator and a free end of the catch trough. A conveyer idler is disposed at the other of the dumping end and the free end. The conveyer comprises a continuous loop arranged about the conveyer drive and the conveyer idler. The conveyer drive drives the conveyer to move debris collected along the catch trough along a first direction of the continuous loop over the evacuator and up the elevator to the dumping end for dumping. The conveyer returns in an opposite direction of the continuous loop to the free end of the catch trough. In some examples, the conveyer includes a plurality of articulated sections, while in other examples, the conveyer comprises a substantially uniform and continuous belt. The conveyer may include a plurality of flights arranged to move debris collected by the catch trough.

In some implementations, the elevator includes a housing having an entrance connected to the evacuator and an exit at the dump height. The housing includes conveyer guides for guiding the conveyer from the housing entrance to the housing exit. In some examples, the elevator housing is arranged to support the conveyer at an angle of between about 10 degrees and about 90 degrees with respect to the catch trough (e.g., about 45 degrees).

The catch trough may extend along an entire length of the wash pad, while in some examples, the catch trough only extends along certain portions of the wash pad, such as a center portion. The length can be any length, regardless of how the length is defined with respect to an orientation of the wash pad (e.g., length or width). The evacuator can be connected to one end of the catch trough, with the catch trough arranged to cause fluid flow towards the evacuator. In some implementations, the evacuator includes an evacuator trough defining an aperture and a fluid mover (e.g., a vacuum, an air mover or a pump) disposed in fluid or pneumatic communication with the evacuator trough aperture. The fluid mover draws wash fluid though the evacuator trough aperture for delivery to a wash fluid destination. The wash fluid destination can be at least one of a fluid treatment system and fluid recirculation system. A debris collector (e.g., wire screen) may be disposed over the evacuator trough aperture, so as to impede debris from entering the aperture. The wash pad may include driven flights (e.g., rubber conveyer flights) arranged to scrape away debris collected on the debris collector.

In some implementations, the wash floor defines channels for receiving at least one of wash fluid and debris. The channels are arranged in fluid communication with the catch trough and can be inclined at an angle of between about 1 degree and about 60 degrees with respect to level ground for promoting at least one of wash fluid and debris to move toward the catch trough. As the wash pad is constructed to support commercial equipment and the like for washing, the wash floor can support at least 10,000 pounds of weight without permanently deforming.

Another aspect of the disclosure provides a wash pad that includes a wash floor for supporting a wash item and a catch trough disposed in fluid communication with the wash floor. The catch trough collecting at least one of wash fluid and debris from the wash floor. The wash pad also includes an evacuator disposed in fluid communication with the catch trough. The evacuator substantially removes wash fluid received from the catch trough and includes a debris collector and a fluid mover in fluid communication with the debris collector for drawing fluid through the debris collector. The debris collector is configured to collect non-fluid debris. The wash pad includes an elevator disposed in fluid communication with the evacuator. The elevator removes debris from the debris collector and elevates the removed debris from a collection height to a dump height for dumping.

In some implementations, the debris collector comprises a screen, such as a wedge shape wire screen, which can be disposed substantially flush with a catch trough surface. The screen may define aperture of any shape or size (e.g., rectangular, circular, etc. having a cross-sectional area of between about 0.25 cm$^2$ and about 4 cm$^2$; however, other sizes are possible as well). The wash pad may include a conveyor disposed along at least one of the catch trough and the elevator. The conveyor has flights (e.g., rubber squeegees) that move at least one of the wash fluid and the debris collected in the trough to the evacuator. The conveyer flights may scrape collected debris off of the debris collector for elevation and dumping by the elevator. Moreover, the conveyor flights may move scraped debris from the debris collector to the dump height for dumping. In some implementations, the wash pad includes a conveyer drive disposed at one of a dumping end of the elevator and a free end of the catch trough. A conveyer idler is disposed at the other of the dumping end and the free end. The conveyer may include a continuous loop arranged about the conveyer drive and the conveyer idler. The conveyer drive drives the conveyer to move debris collected along the catch trough along a first direction of the continuous loop over the evacuator and up the elevator to the dumping end for dumping. The conveyer returns in an opposite direction of the continuous loop to the free end of the catch trough. The conveyer may include a plurality of articulated sections.

In some examples, the evacuator is connected to one end of the catch trough, which can be arranged to cause fluid flow towards the evacuator. The catch trough may extend along an entire length of the wash pad.

Yet another aspect of the disclosure provides a conveyer system for a wash pad. The conveyer system includes a catch trough having at least one portion connectable to a wash floor of the wash pad. The catch trough collects at least one of wash fluid and debris from the wash floor. The conveyer system also includes an evacuator disposed in fluid communication with the catch trough and an elevator disposed in fluid communication with the evacuator. The evacuator substantially removes wash fluid received from the catch trough, and the elevator elevates debris from a collection height to a dump height for dumping. The conveyer system also includes a conveyer disposed along the catch trough and the elevator. The conveyer moves at least debris along the catch trough at the collection height and elevates the debris to the dump height for dumping.

Implementations of the disclosure may include one or more of the following features. In some implementations, the wash pad includes a conveyer drive disposed at one of a dumping end of the elevator and a free end of the catch trough. A conveyer idler is disposed at the other of the dumping end and the free end. The conveyer comprises a continuous loop arranged about the conveyer drive and the conveyer idler. The conveyer drive drives the conveyer to move debris collected along the catch trough along a first direction of the continuous loop over the evacuator and up the elevator to the dumping end for dumping. The conveyer returns in an opposite direction of the continuous loop to the free end of the catch trough. In some examples, the conveyer comprises a plurality of articulated sections.

The conveyor may include flights that move at least one of the wash fluid and the debris collected in the trough to the evacuator. In some examples, the conveyer flights scrape collected debris off of the evacuator for elevation and dumping by the elevator. The conveyor flights may move scraped debris from the evacuator to the dump height for dumping.

In some implementations, the elevator includes a housing having an entrance connected to the evacuator and an exit at the dump height. The housing includes conveyer guides for guiding the conveyer from the housing entrance to the housing exit. In some examples, the elevator housing is arranged to support the conveyer at an angle of between about 10 degrees and about 90 degrees with respect to the catch trough (e.g., about 45 degrees).

The catch trough may extend along an entire length of the wash pad, while in some examples, the catch trough only extends along certain portions of the wash pad, such as a center portion. The evacuator can be connected to one end of the catch trough, with the catch trough arranged to cause fluid flow towards the evacuator. In some implementations, the evacuator includes an evacuator trough defining an aperture and a fluid mover (e.g., a vacuum, an air mover or a pump) disposed in fluid or pneumatic communication with the evacuator trough aperture. The fluid mover draws wash fluid though the evacuator trough aperture for delivery to a wash fluid destination. The wash fluid destination can be at least one of a fluid treatment system and fluid recirculation system. A debris collector (e.g., wire screen) may be disposed over the evacuator trough aperture, so as to impede debris from entering the aperture.

Yet another aspect of the disclosure provides a method of washing a debris carrying item on a wash pad. The method includes placing the item on the wash pad, using wash fluid to remove the debris from the item, and collecting at least one of the wash fluid and debris in a catch trough disposed in fluid communication with the wash floor. The method also includes moving at least one of the wash fluid and debris to an evacuator disposed in fluid communication with the catch trough, and elevating debris from a collection height to a dump height for dumping. The evacuator substantially removes wash fluid received from the catch trough.

Implementations of the disclosure may include one or more of the following features. In some implementations, the method includes disposing the catch trough in fluid communication with a longitudinal central portion of the wash floor. The method may include using a conveyer disposed along the catch trough and the elevator for moving at least debris along the catch trough at the collection height and elevating the debris to the dump height for dumping. In some examples, the method includes moving a conveyer disposed along at least one of the catch trough and the elevator to move debris collected on the evacuator to the elevator. In further examples, the method includes moving a flight of a conveyer disposed along at least one of the catch trough and the elevator to scrape collected debris off of the evacuator. The flight of the conveyer can be moved so as to move the scraped debris to the dump height for dumping.

The elevator may include a housing having an entrance connected to the evacuator and an exit at the dump height. The housing may also include conveyer guides for guiding the conveyer from the housing entrance to the housing exit. In some examples, the method includes arranging the elevator to support the conveyer at angle of between about 10 degrees and about 90 degrees with respect to the catch trough. The method may also include arranging the catch trough to extend along an entire length of the wash pad. In some examples, the method includes arranging the wash floor to have at least one portion inclined at an angle of between about 1 degree and about 60 degrees with respect to level ground. The wash floor can be inclined to promote at least one of wash fluid and debris to move toward the catch trough. Nevertheless, the wash floor may also be arranged substantially level with respect to the ground.

The evacuator may be arranged to be connected to one end of the catch trough, and the catch trough may be arranged to cause fluid flow towards the evacuator. In some implementations, the evacuator includes an evacuator trough defining an aperture and having a fluid mover disposed in fluid or pneumatic communication with the evacuator trough aperture. The fluid mover draws wash fluid though the evacuator trough aperture for delivery to a wash fluid destination. The method may include delivering the wash fluid removed by the evacuator to at least one of a fluid treatment system and fluid recirculation system. A debris collector may be arranged over the evacuator trough aperture for impeding or preventing the entrance of debris into the evacuator trough aperture.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a sectional view of an exemplary platform of a wash pad.

FIG. 5 is a sectional view of the platform of FIG. 4 along a perpendicular direction.

FIG. 12 is a perspective view of an exemplary elevator for a trough assembly.

FIG. 13 is a side view of the elevator of FIG. 12.

Like reference symbols in the various drawings indicate like elements.

DETAILED DESCRIPTION

The disclosure provides a wash pad for supporting and/or housing an item (such as a vehicle or large industrial equipment) for washing. A user can stand on the wash pad and manually wash the item with a high pressure washer, for example. The wash pad supports the item to be washed during the washing operation and collects wash fluid and/or debris washed from the item. With increased concern for the environment and/or for other containment reasons, the wash pad can be used to collect and contain wash fluid and/or debris washed from the item. The wash fluid can be treated (e.g., to remove contaminants) and recirculated for reuse in washing the item. The wash pad can be a portable and/or modular structure. Generally, the wash fluid and/or wash debris falls or flows into a catch trough, which guides the wash fluid and/or wash debris to a mover or elevator that moves the wash fluid and/or wash debris to a dumping station.

Figure 1A:
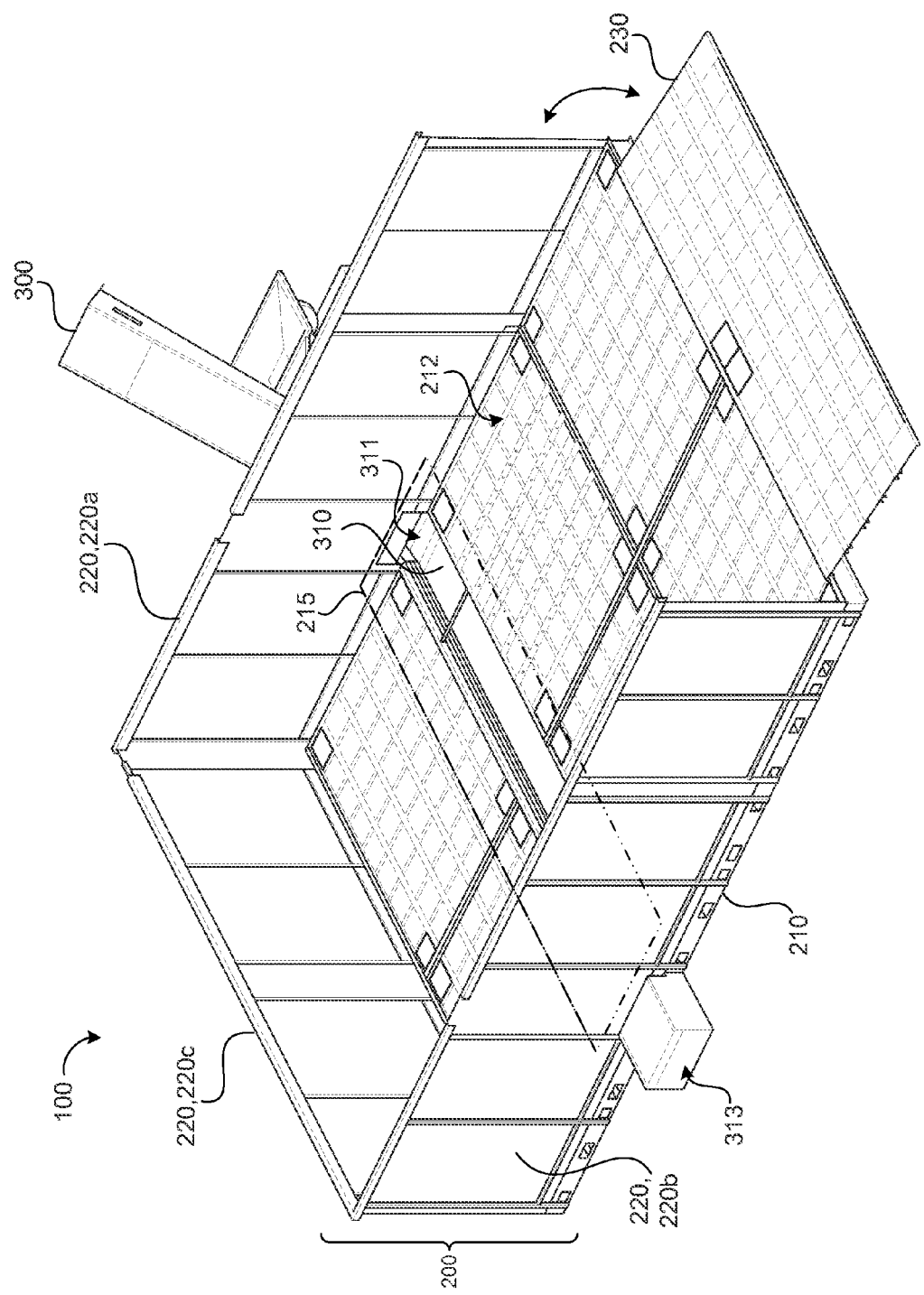
FIGS. 1A and 1B are perspective views of an exemplary wash pad.
Figure 1B:
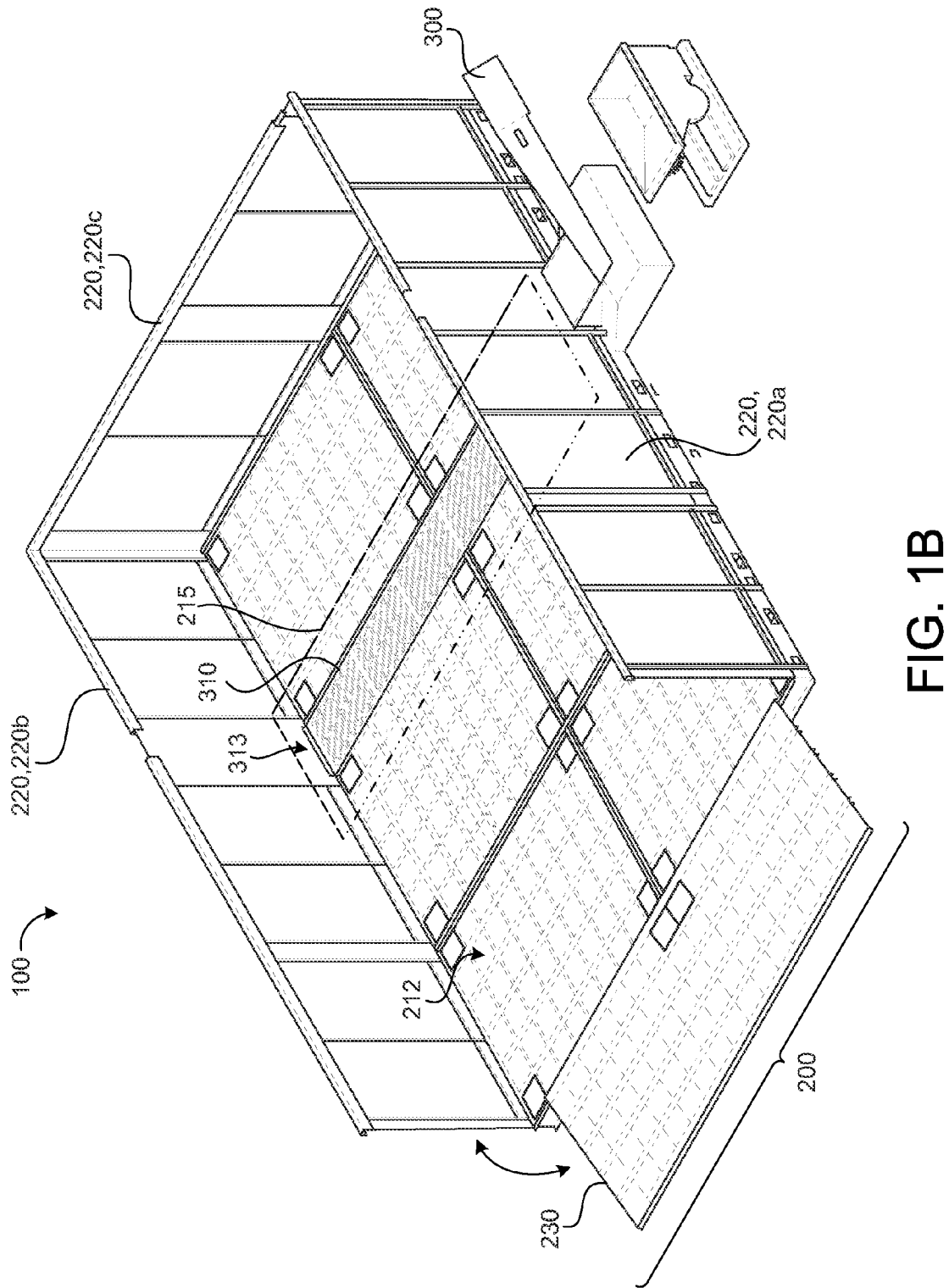
Figure 1C:
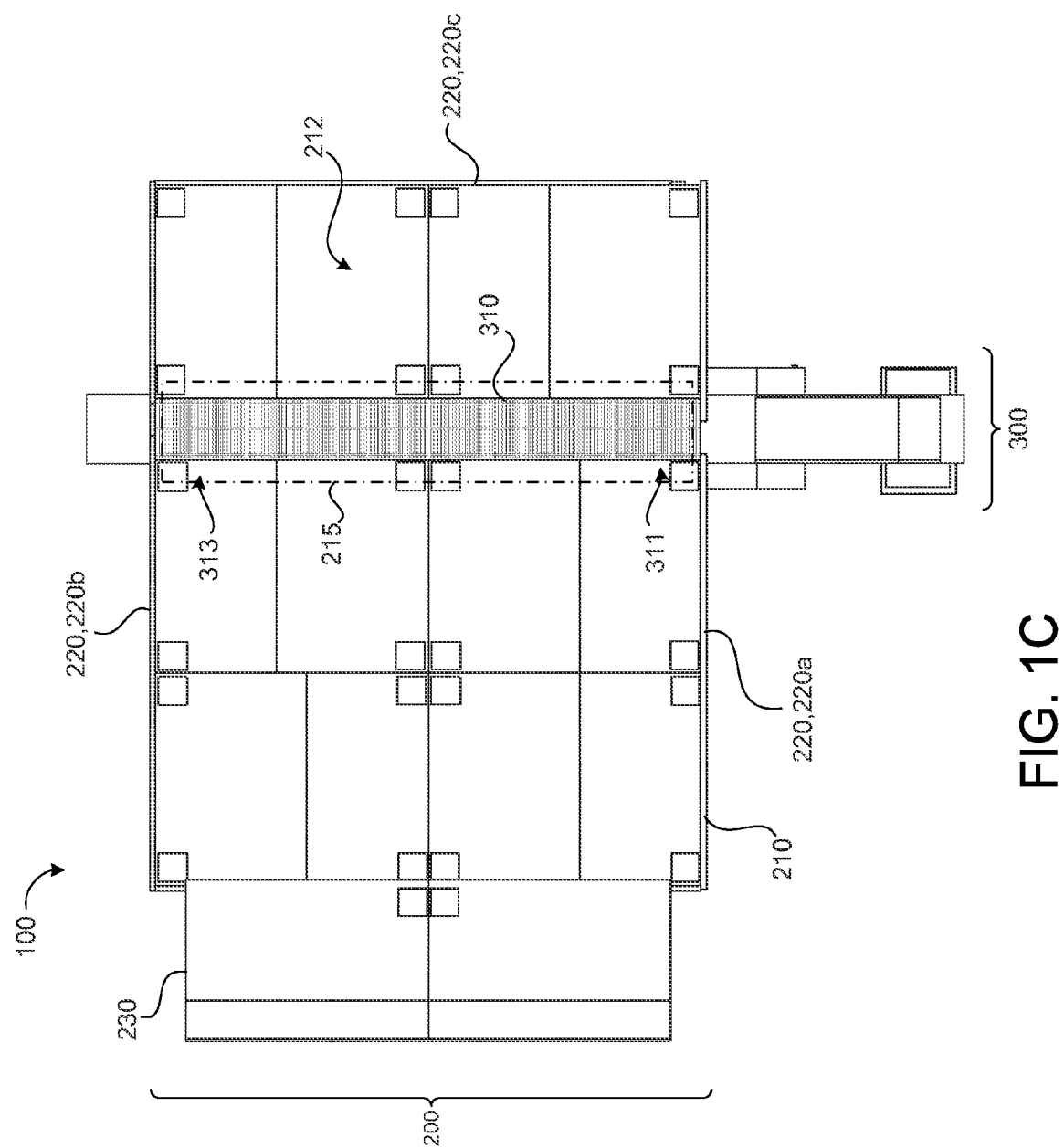
FIG. 1C is a top view of the wash pad shown in FIG. 1A.
Figure 1D:
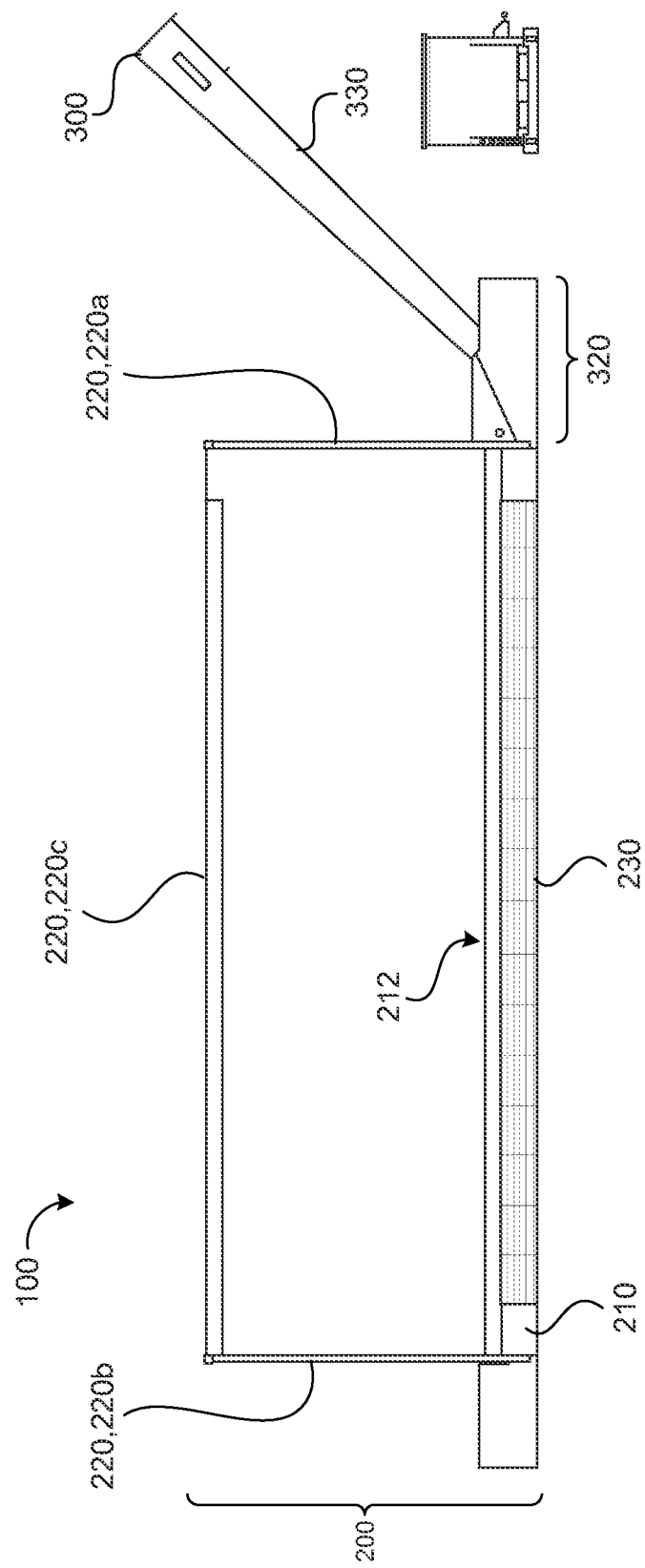
FIG. 1D is a side view of the wash pad shown in FIG. 1A.
Figure 1E:
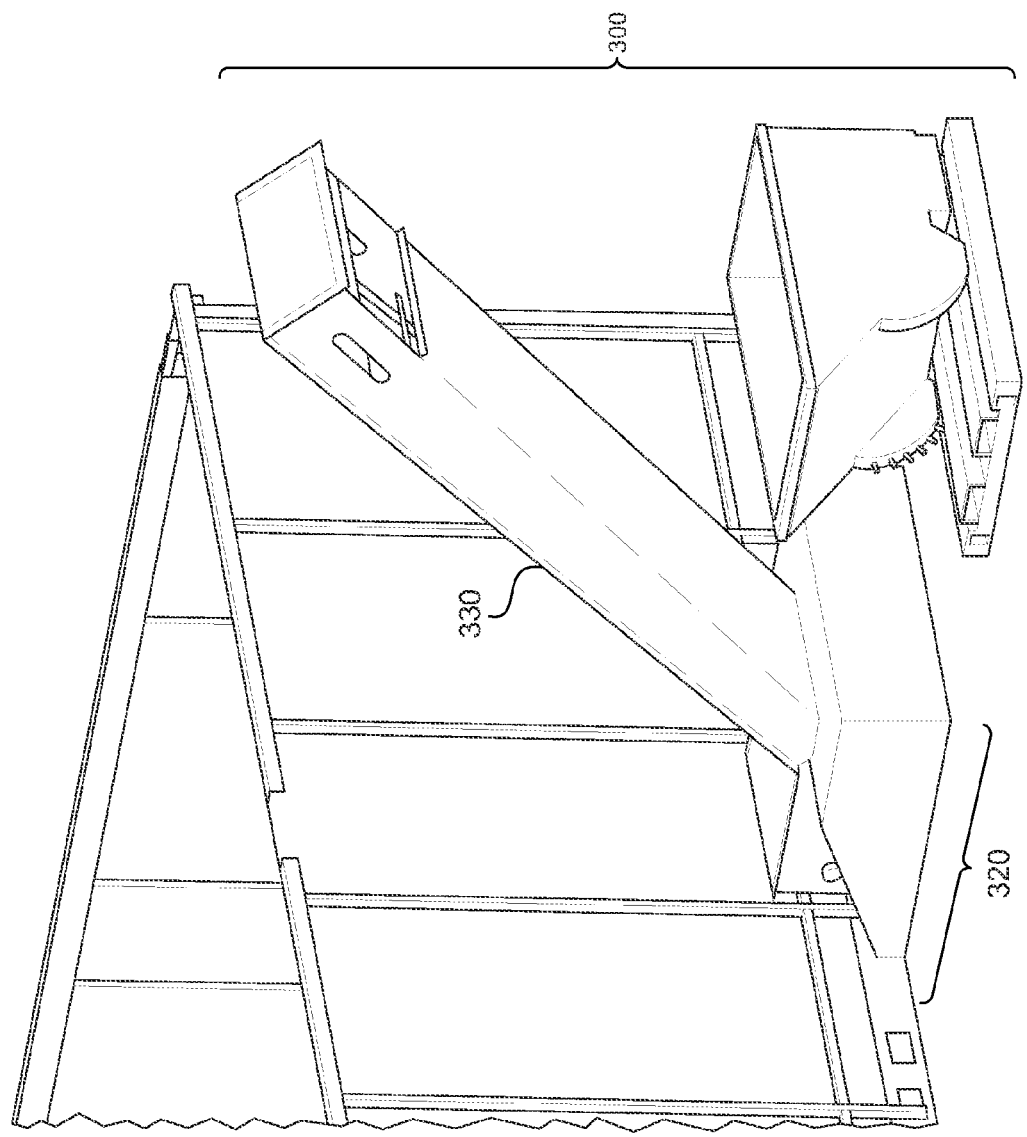
FIGS. 1E and 1F are partial perspective views of an exemplary trough assembly of the wash pad shown in FIG. 1A.
Figure 1F:
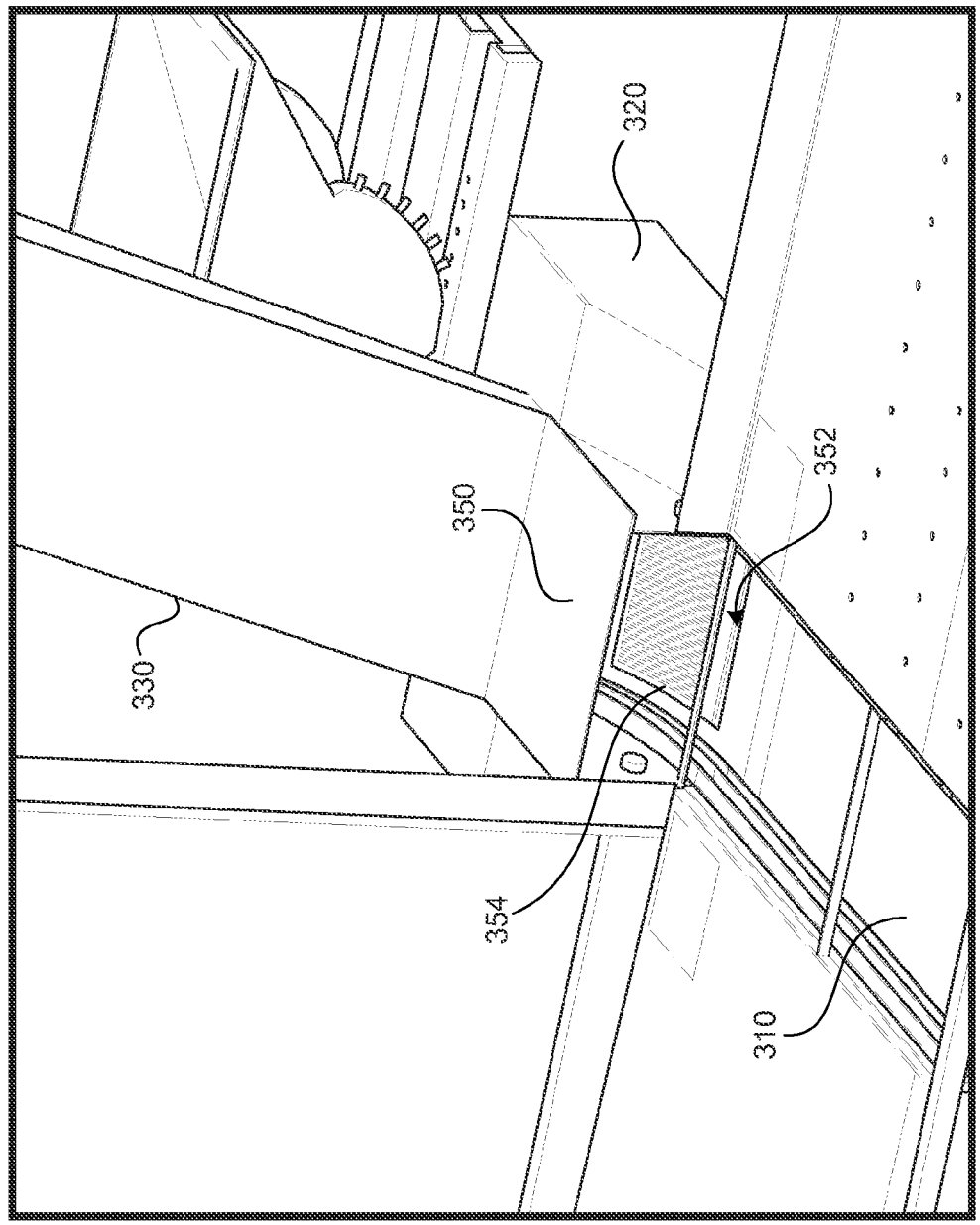
Figure 1G:
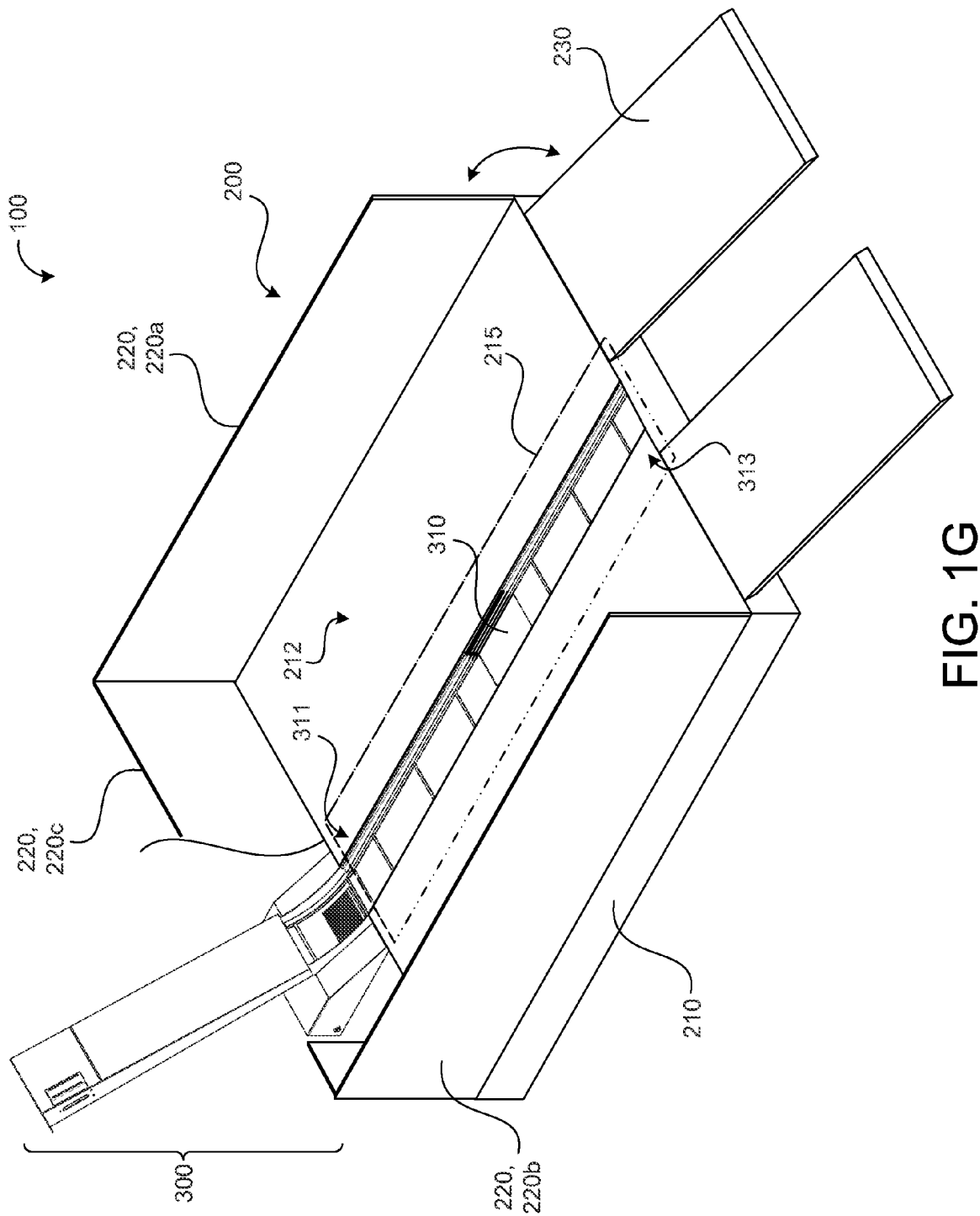
FIG. 1G is a perspective view of an exemplary wash pad.
Figure 2:
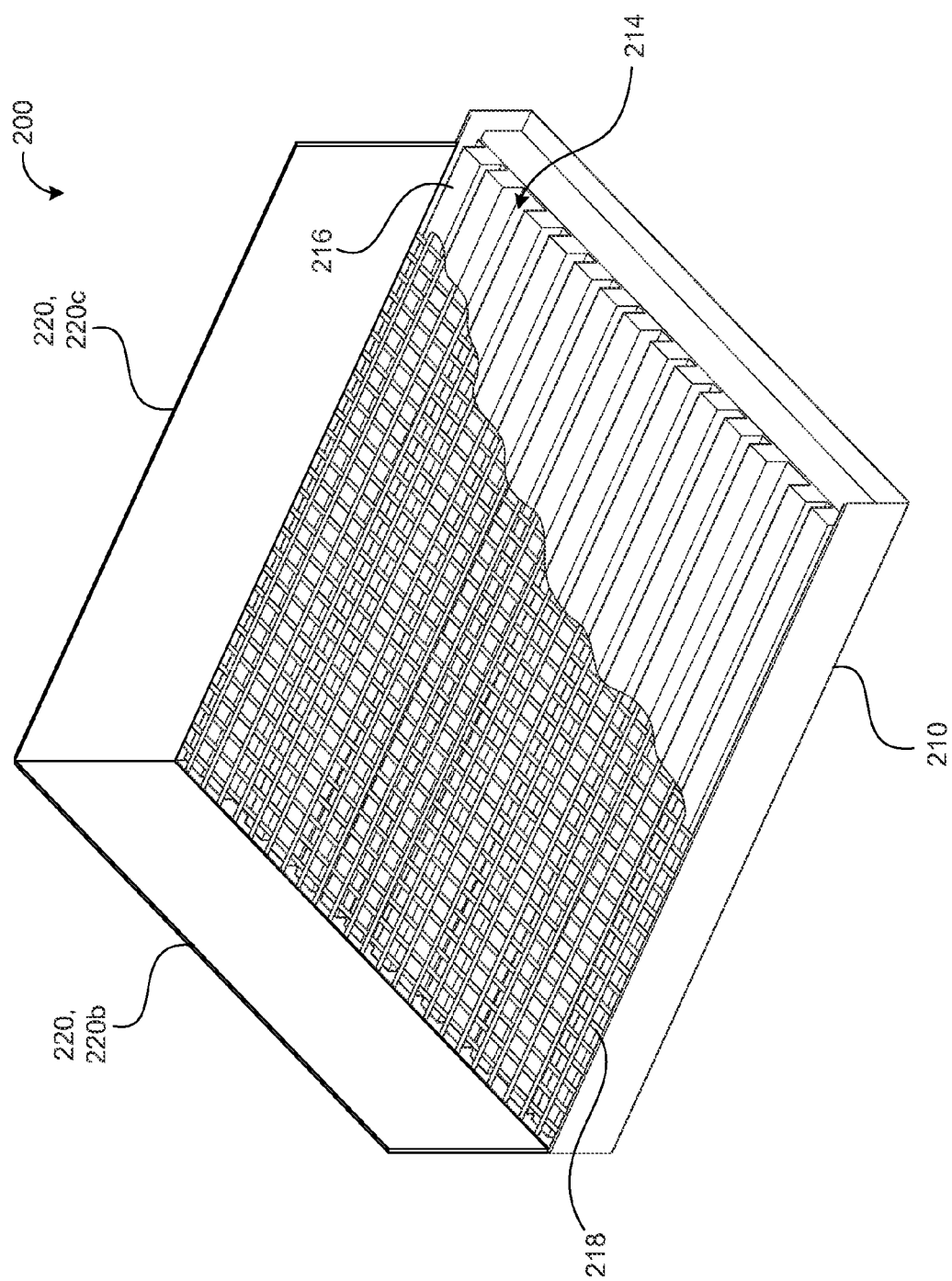
FIG. 2 is a perspective view of an exemplary platform of a wash pad.
Figure 3:
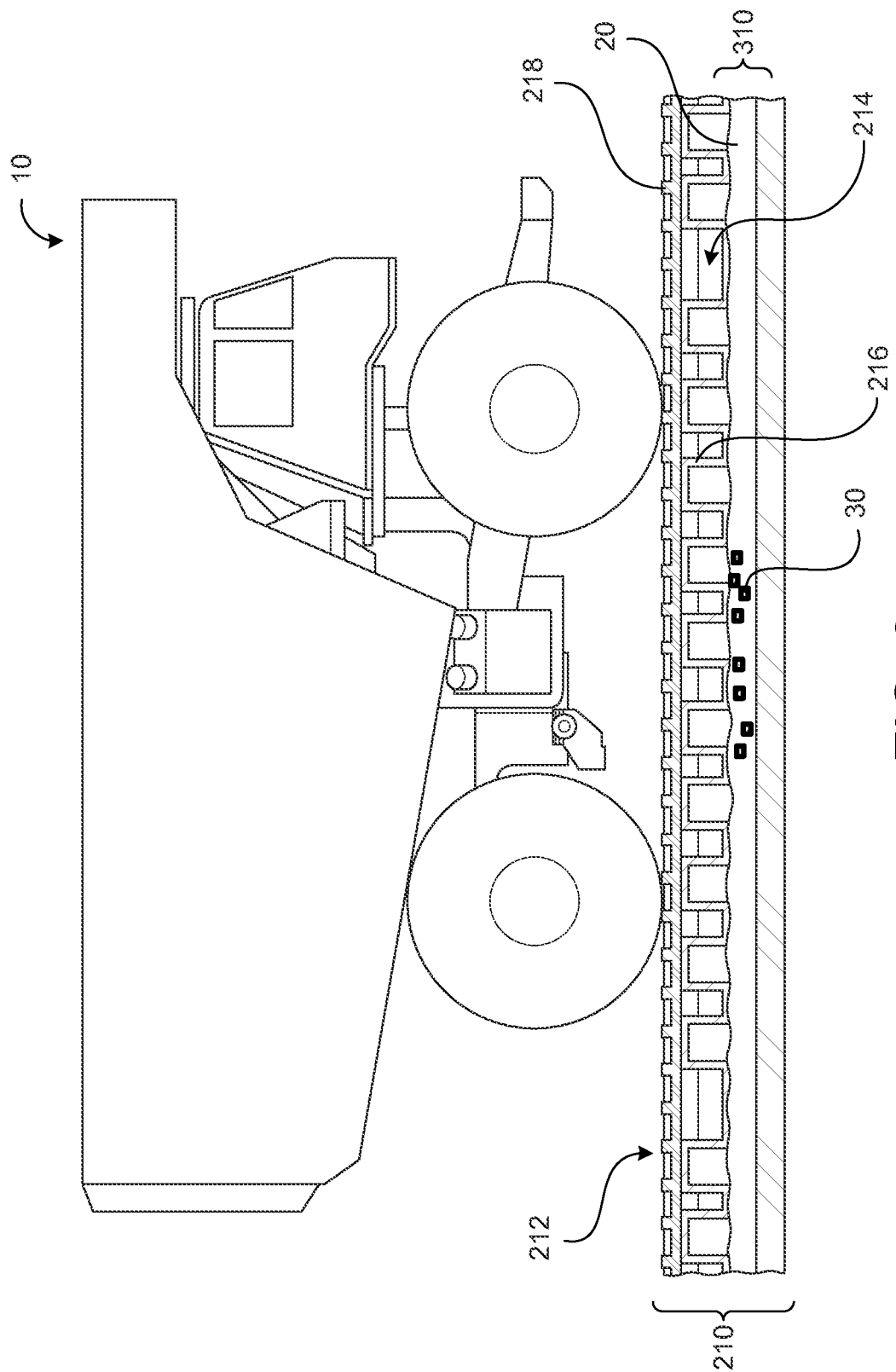
FIG. 3 is a sectional view of a platform of a wash pad supporting an item for washing.

Referring to FIGS. 1A-3, a wash pad 100 includes a support structure 200 for supporting an item 10 to be washed and at least one trough assembly 300 in fluid communication with the support structure 200. The support structure 200 includes a platform 210 configured to support the wash item 10 (FIG. 3). Moreover, the support structure 200 can be sized, arranged, and designed to support certain types of wash items 10 (e.g., vehicles, industrial equipment, etc.). The platform 210 can be constructed to have relatively high weight bearing strength to support vehicles in the range of 20 to 30 tons per axle, a 10,000 lb item 10 or 6000 lbs/ft$^2$ without permanently deforming. In some implementations, the platform 210 includes modular sections connected together to allow for variation in size and shape of the platform 210 to allow washing of various sorts of items 10.

In some implementations, the support structure 200 includes one or more sides 220 to help contain wash fluid 20 and/or washed debris 30 in the wash pad 100. The containment aspect of the wash pad 100 allows users to avoid ground contamination when washing items 10 having contaminants, such as oil, gasoline, anti-freeze, etc. In the example shown, the support structure 200 includes right, left, and back sides 220a, 220b, 220c; however, more or less sides may be used, as necessary. For example, the support structure may have no sides 220, two sides 220 (such as the right and back sides 220a, 220c), a top side (not shown), and/or a front gated side (not shown). The support structure 200 may include one or more ramps 230 adjacent or connected to the platform 210 for driving wash items 10 (e.g., a forklift) onto the platform 210. In some examples, the ramp 230 is pivotally connected to the platform 210 and moves between open and closed positions. In the closed position, the ramp 230 can serve as another side 220 of the support structure for containing wash fluid and/or wash debris. The platform 210 may have a relatively low profile to allow low clearance vehicles to be driven up and onto the platform 210.

During washing of the item 10, the wash fluid 20, including any contaminants, solids, and debris therein, falls to the platform 210 which can be sloped or shaped to cause the wash fluid 20 to flow to one or more trough assemblies 300 for collection. In the example shown, the wash pad 100 includes a trough assembly 300 disposed along a central region 215 of the platform 210 (e.g., transverse (FIG. 1A) and/or longitudinal (FIG. 1G)); however, a trough assembly 300 may be positioned along any perimeter of the platform 210 and/or in other regions of the platform 210, as necessary, such as at repeating intervals along the platform 210. In some examples, the one or more trough assemblies 300 are constructed integrally with the platform 210, while in other examples, one or more of the trough assemblies 300 are separate stand-alone assemblies attached to or positioned next to the platform 210.

Each trough assembly 300 includes a catch trough 310 disposed in fluid communication with the platform 210 for collection of wash fluid 20. In the example shown, the catch trough 310 has a rectangular cross-sectional shape; however, other shapes are possible as well, such as triangular, elliptical, etc. The platform 210 and catch trough 310 are arranged such that wash fluid 20 caught by the platform 210 flows into the catch trough 310. The platform 210 may have a slight concave or wedge shape to cause fluid flow towards the central region 215 for collection by a catch trough 310 disposed thereabout. In other examples, the platform 210 has a convex shape to cause fluid to flow to the perimeter of the platform 210 for collection by catch troughs 310 thereabout.

FIG. 2 provides a perspective view of a portion of an exemplary platform 210. In the example shown, the platform 210 has a corrugated or undulating upper surface or wash floor 212 such that wash fluid falls into channels 214 formed by undulations 216, rather than pooling on the wash floor 212. The undulations 216 can be formed by bending the wash floor 212 or by an arrangement of beams (e.g., box and/or channel beams) spaced to define the channels 214 therebetween. The platform 210 may also include a perforated cover 218 (e.g., wire screen) to provide a substantially flat surface for walking on.

FIGS. 4 and 5 provide section views of an exemplary platform 210 along perpendicular directions with respect to each other. In the example shown, the wash floor 212 of the platform 210 is sloped or shaped to cause fluid to flow toward the catch trough(s) 310. For an undulating wash floor 212, the channels 214 can be sloped or shaped to cause wash fluid 20 to flow to the catch trough 310, while the undulations can collectively provide a substantially flat supporting surface for the item 10. An angle of inclination 8 of the channels 214 can be between 1° and about 60° (e.g., about 10°) with respect to level ground. Nevertheless, wash fluid 20 can still drain off the wash floor 212 without sloping channels 214 or platform 210 (e.g., substantially level).

Referring to FIGS. 1E, 1F and 6-8, the trough assembly 300 includes a catch trough 310 in fluid communication with an evacuator 320 and an elevator 330. The catch trough 310 collects wash fluid 20, debris 30, or a mixture thereof draining from the wash floor 212 of the platform 210. The evacuator 320 substantially removes or evacuates liquid collected by the catch trough 310, and the elevator 330 lifts any remaining portions of the collected mixture (e.g., debris 30) from a collection height $H_C$ to a dump height $H_D$. The evacuator 320 may or may not include a vacuum for pulling fluid into it.

Figure 9:
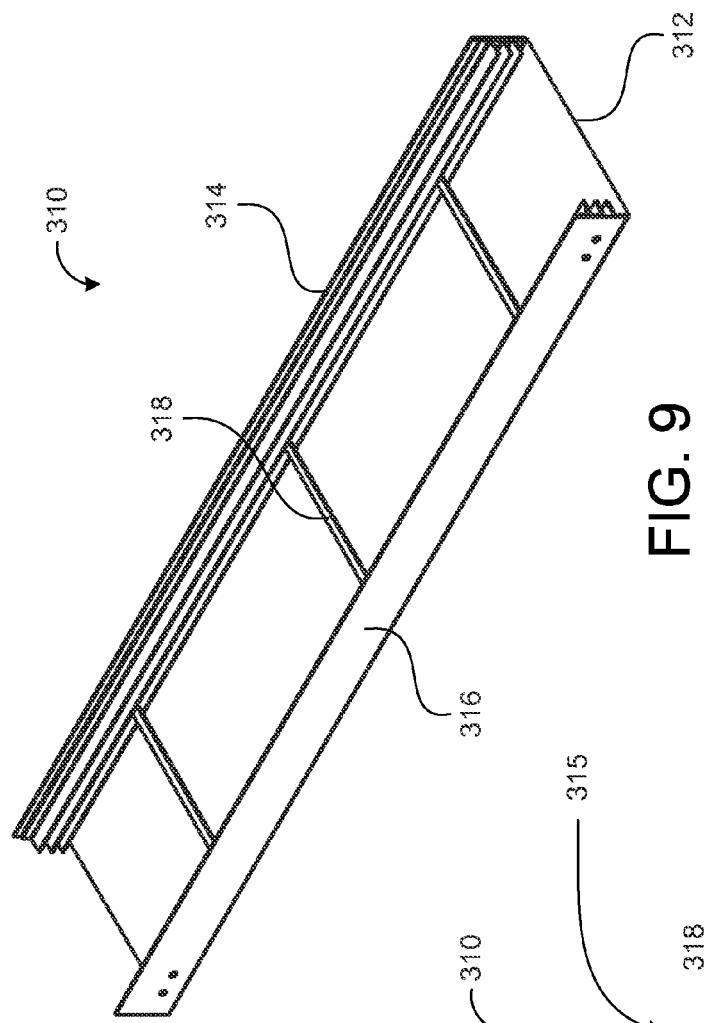
FIG. 9 is a perspective view of an exemplary catch trough of a trough assembly.
Figure 10:
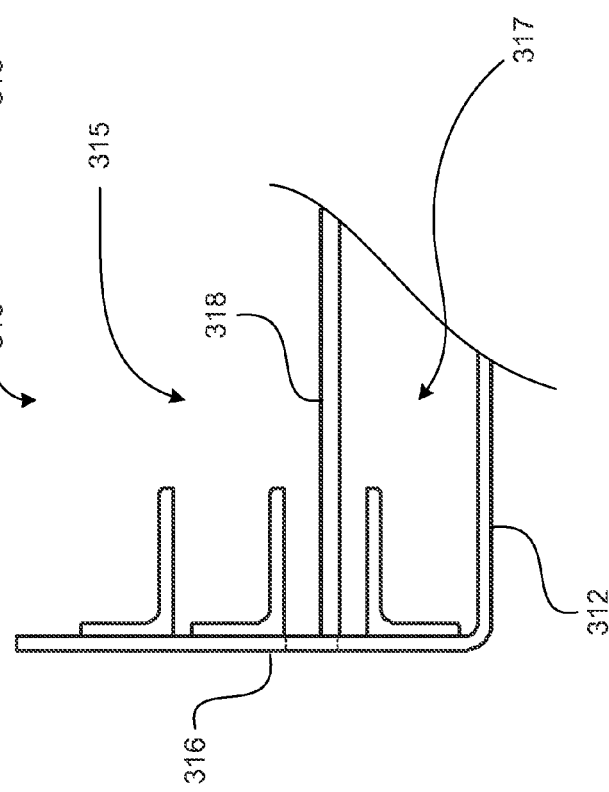
FIG. 10 is a partial front view of the catch trough of FIG. 9.

FIG. 9 provides a perspective view of an exemplary catch trough 310. The catch trough 310 includes a bottom wall 312 and first and second side walls 314, 316 connected to opposite ends of the bottom wall 312. Referring to FIG. 10, the catch trough 310 may also include one or more cross supports 318 or a collection wall connected to opposite ends of the bottom wall 312 and spaced from the bottom wall 312. Together, the first and second side walls 314, 316 and the cross supports or collection wall 318 define a collection region 315. Moreover, the first and second side walls 314, 316, the bottom wall 312, and the cross supports or collection wall 318 together define a return region 317 (e.g., for a conveyer). At least one of side walls 314, 316 of the catch trough 310 can be connected to the wash floor 212 of the platform 210 to allow wash fluid 20 and/or debris 30 to flow from the wash floor 212 into the collection region 315 of the catch trough 310.

Figure 6:
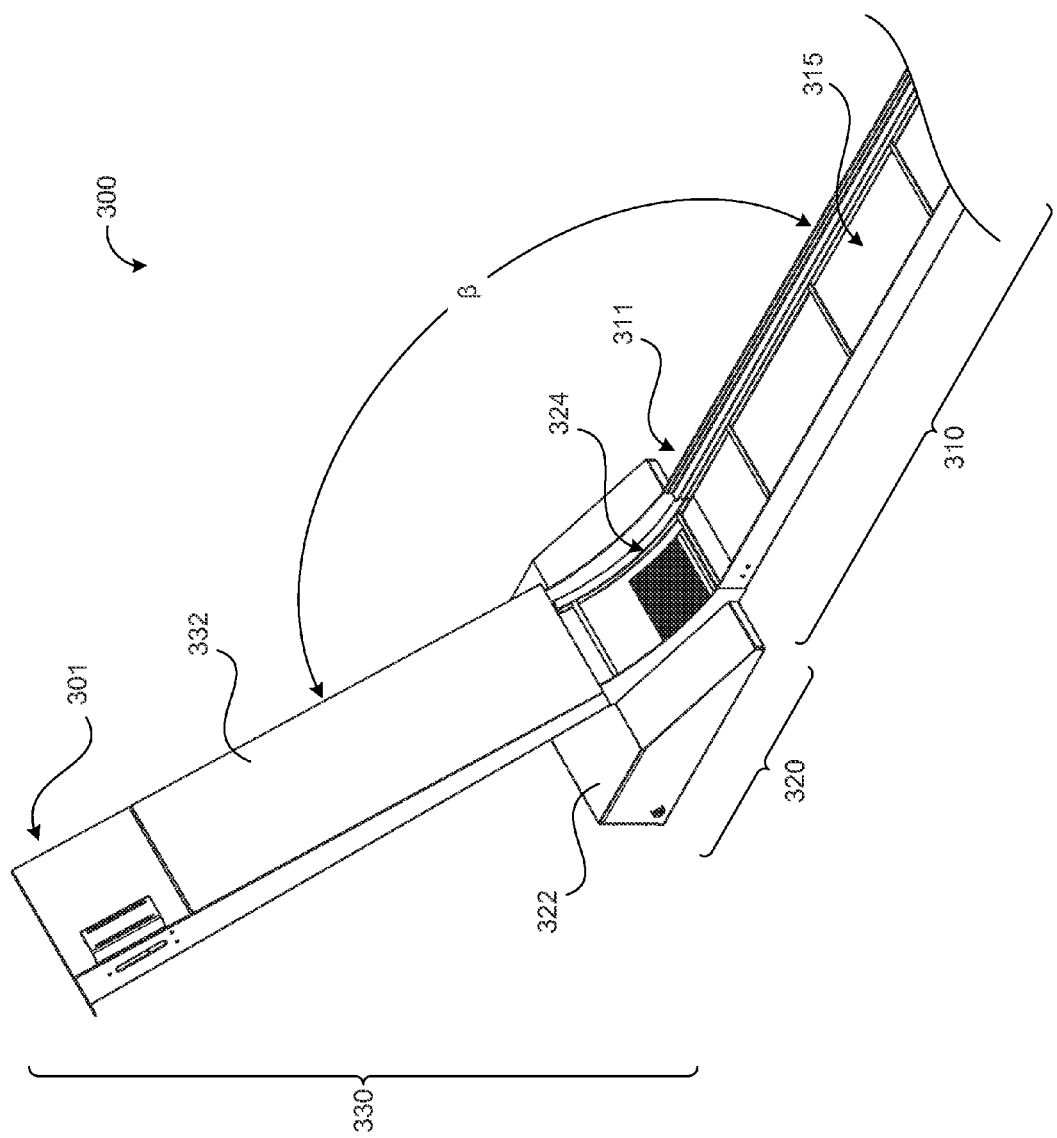
FIG. 6 is a perspective view of an exemplary trough assembly for a wash pad.
Figure 7:
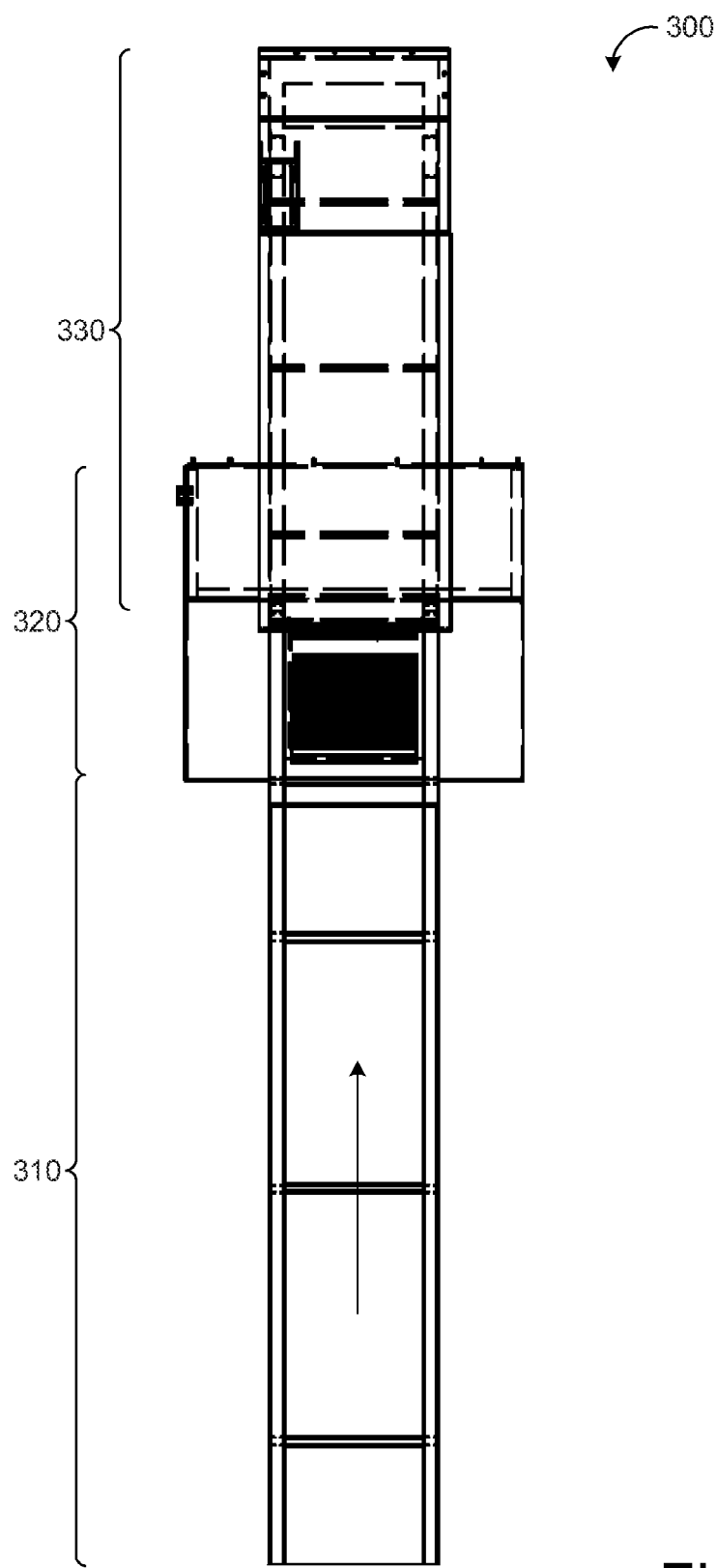
FIG. 7 is a top view of the trough assembly of FIG. 6.
Figure 8:
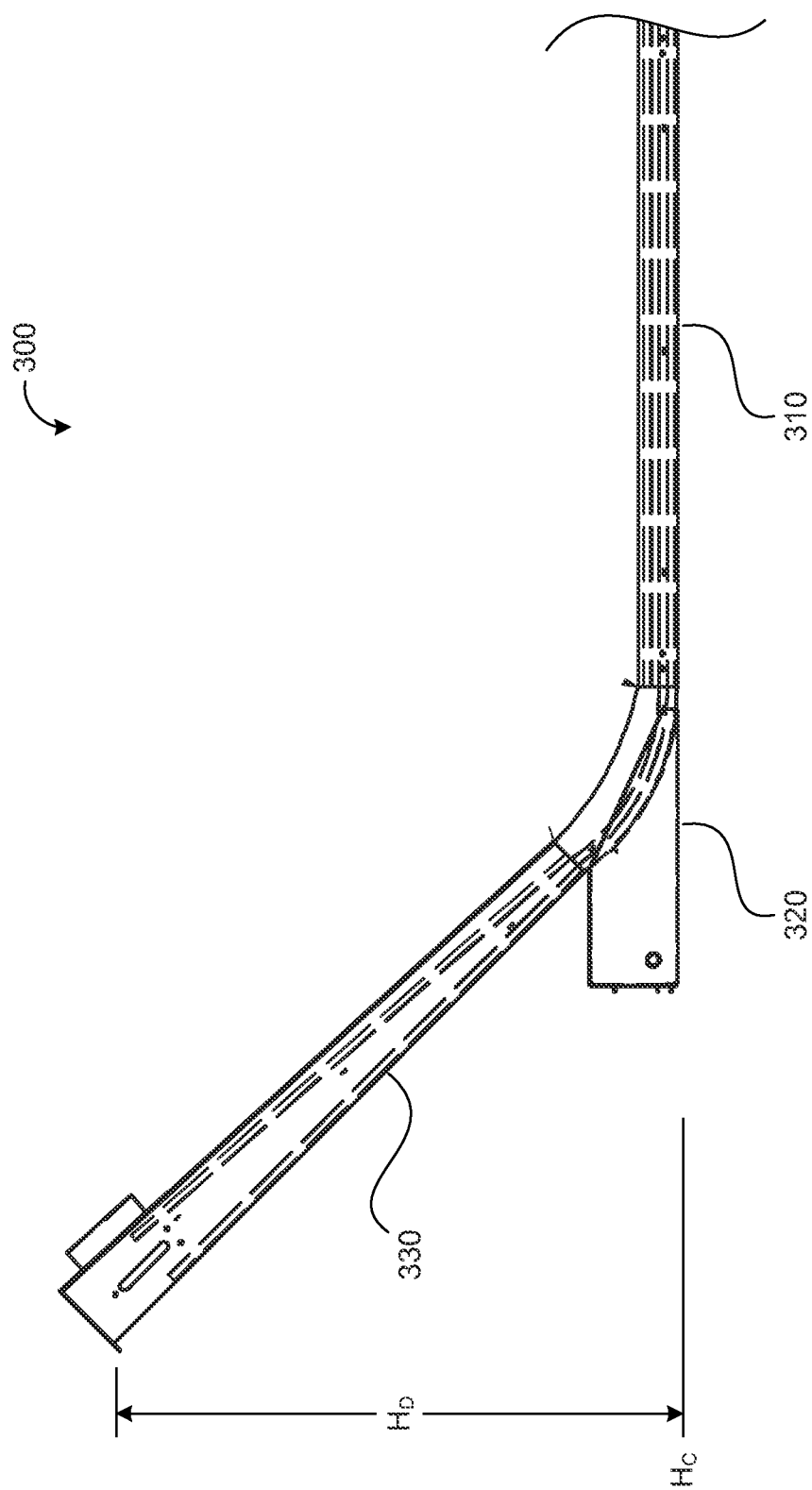
FIG. 8 is a side view of the trough assembly of FIG. 6.
Figure 11:
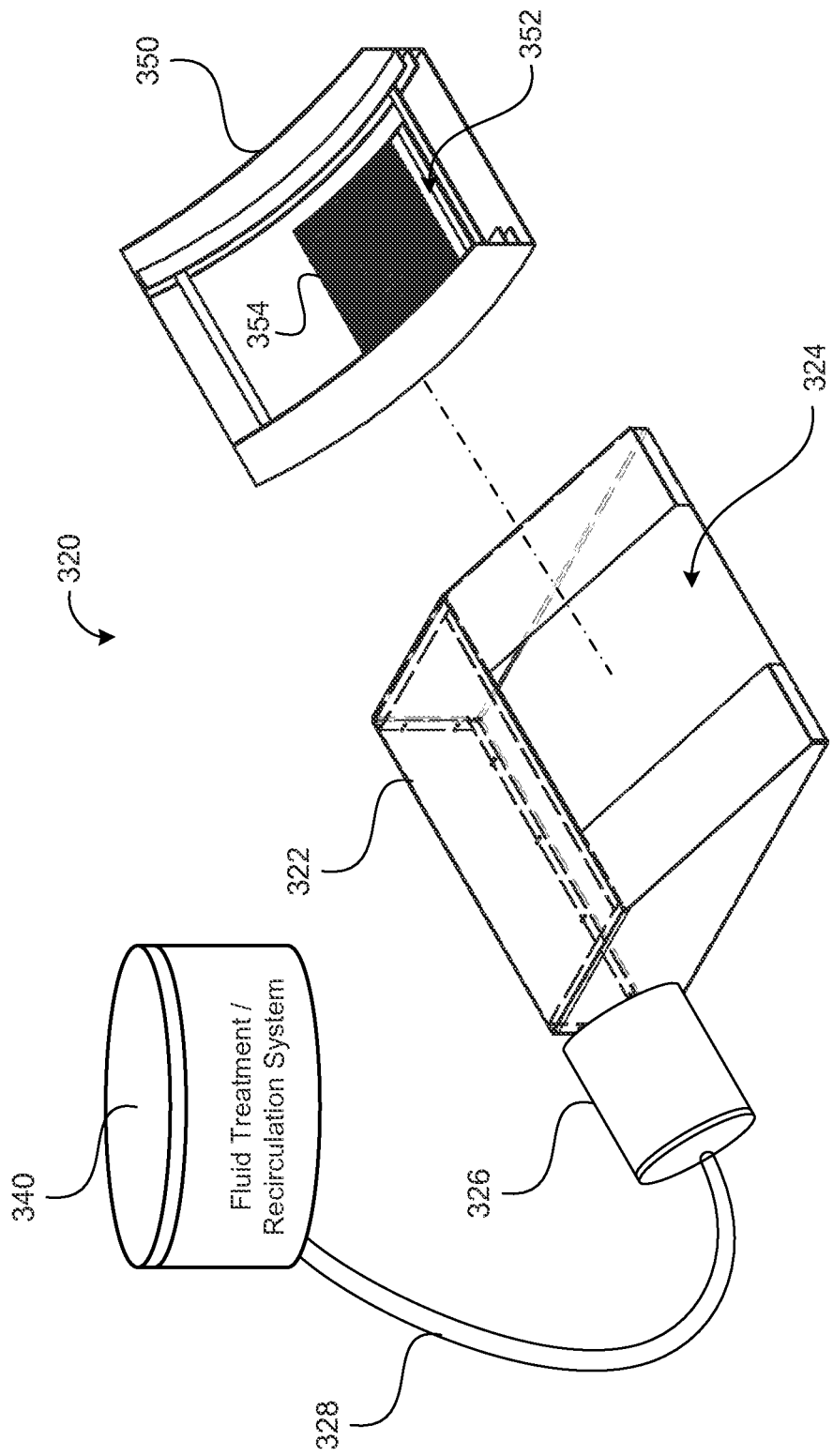
FIG. 11 is a partial exploded perspective view of an exemplary evacuator for a trough assembly.

Referring to FIGS. 6 and 11, the catch trough 310 of the trough assembly 300 is in fluid communication with the evacuator 320, which receives collected wash fluid 20 for substantially evacuating or separating liquid from among any debris 30 mixed therewith. In the example shown, the evacuator 320 is joined to an evacuation end 311 of the catch trough 310, which extends to or past a perimeter of the platform 210 (see also FIG. 1). However, in other examples, the evacuator 320 can be disposed any where along the catch trough 310. The catch trough 310, the bottom wall 312 and/or the collection region 315 may be angled, sloped, and/or shaped to cause collected fluid (e.g., fluid collected in the collection region 315) to flow to the evacuation end 311 of the catch trough 310. The evacuator 320 includes a housing 322 defining a mouth 324 and a fluid mover 326 (e.g., vacuum, pump, or air mover) in fluid communication with the mouth 324. The fluid mover 326 draws air and/or liquid into the mouth 322 and delivers the liquid/air through a connected passageway 328 for delivery to an evacuation destination 340, such as a fluid treatment and/or recirculation system.

In the example shown, the evacuator 320 includes an angle trough 350 connecting the catch trough 310 to the elevator 330. The angle trough 350 defines an aperture 352 which is covered by a debris collector 354 (e.g., wire mesh, perforated or slotted cover, etc.) to catch loose debris from entering therethrough. In some examples, the debris collector 354 is a wedge shaped wire screen arranged substantially flush with the catch trough 310 in the aperture 352. The aperture 352 is disposed in pneumatic communication with the fluid mover 326. As wash fluid 20 and/or debris 30 is received by the evacuator 320 along the angle trough 350, the fluid mover 326 draws any liquid portion of the wash fluid 20 and/or debris 30 through the debris collector 354 and trough aperture 352, and into the mouth 324 of the evacuator housing 322 for evacuation to the evacuation destination 340. Any debris 30 collected on the debris collector 354 can be removed therefrom.

Referring to FIGS. 6, 12 and 13, the evacuator 320 is in fluid communication with the elevator 330 for elevating or lifting debris 30 separated from the wash fluid 10 from a collection height $H_C$ at the evacuator 320 to a dump height $H_D$. In some implementations, the elevator 330 includes an elevator housing 332 connected to the evacuator 320 and configured to support a rotatably driven conveyer 360 for carrying the debris 30 up the inclined elevator housing 332 for dumping at the dump height $H_D$. In some implementations, the conveyer 360 includes rubber flights 362 for moving the wash fluid 20, debris 30, or mixture thereof through the trough assembly 300. The rubber flights 362 may be used to scrape accumulated debris 30 from the debris collector 354 of the evacuator 320. For example, debris 30 collected in the catch trough 310 flows or is moved (e.g., via the conveyer 360) along the catch trough 310 to the debris collector 354 where fluid mover 326 can pull water through the debris collector 354 by applying a vacuum or negative pressure on a back side of the debris collector 354, causing any debris 30 suspended in the water to collect on an opposite front side of the debris collector 354. The debris collector 354 can define holes or apertures of a size conducive for collecting debris above a threshold size or volume. Spaced flights 362 along the conveyer 360 periodically scrape along the front side of the debris collector 354, removing any collected or packed on debris 30 and any impediments to fluid flow therethrough. Therefore, the flights 362 may operate in some capacity as a debris collector cleaners to allow continuous evacuation of fluid through the debris collector 360 by fluid mover 326.

In the examples shown, the elevator housing 332 includes an entrance 334 and an exit 336 with conveyer guides 338 disposed therebetween for guiding the conveyer 360 through the elevator housing 332. The elevator housing 332 is arranged to support the conveyer 360 at an angle β of between about 10 degrees and about 90 degrees with respect to the catch trough 310.

In some implementations, the conveyer 360 is a continuous loop, which can be made of rotatably coupled or articulated sections 364 (e.g., chain links) or a continuous belt. The conveyer 360 may extend from a dumping end 301 of the trough assembly 300 (FIG. 6) (e.g., at the elevator housing exit 336) to the evacuator 320 for moving evacuated mixture (e.g., debris 30) to the dump height $H_D$ for disposal. In other examples, the conveyer 360 extends from the dumping end 301 of the trough assembly 300 to a free end 313 of the catch trough 310, such as shown in the example of FIG. 1.

Figure 14:
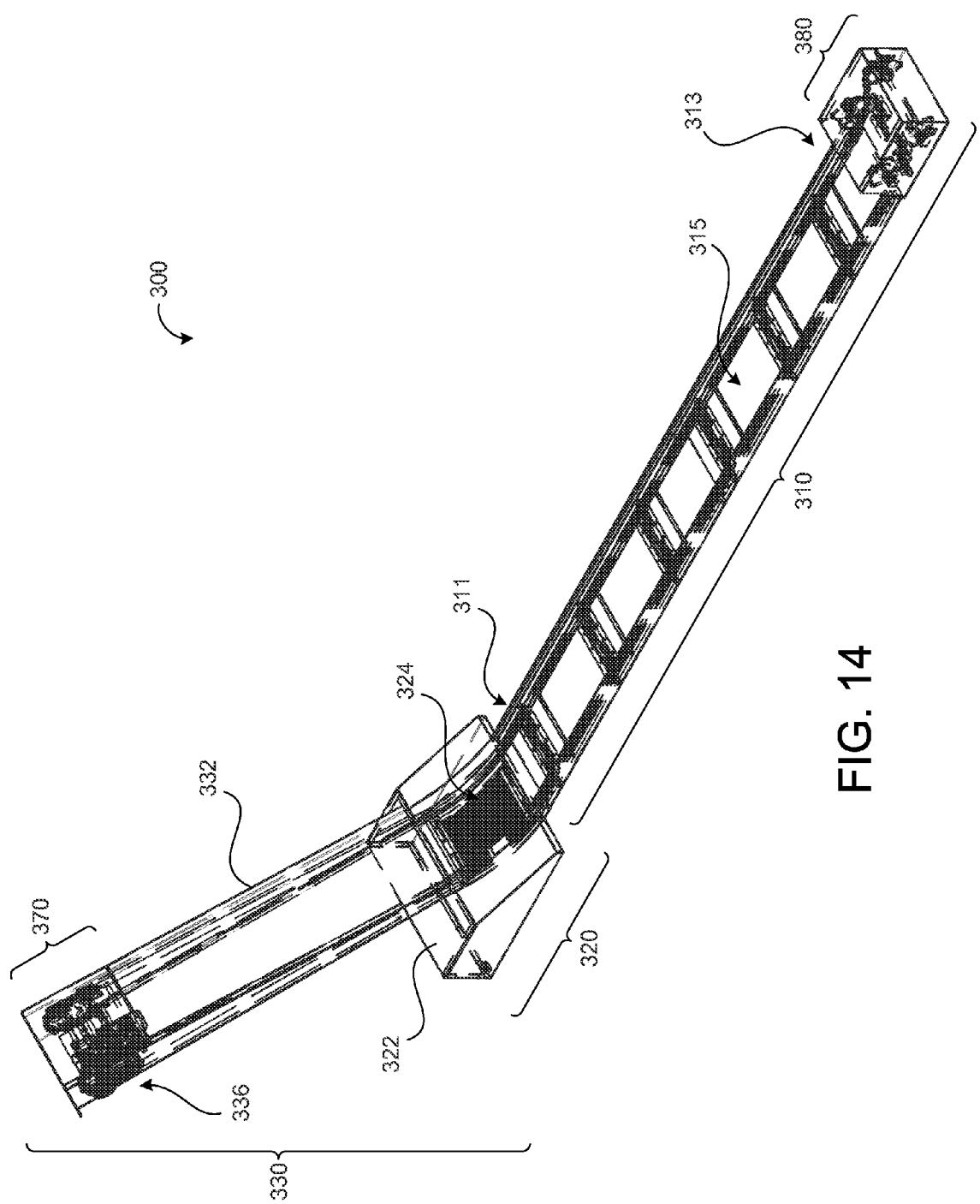
FIG. 14 is a perspective view of an exemplary trough assembly for a wash pad.
Figure 15:
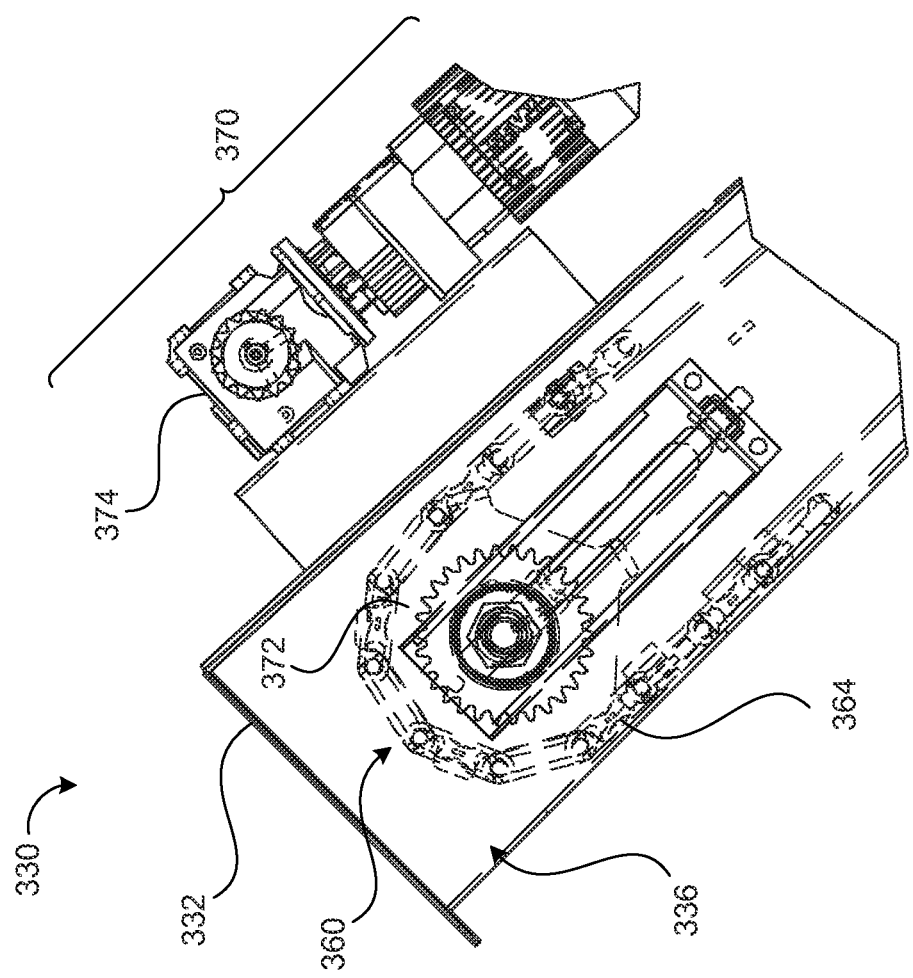
FIG. 15 is a side view of an exemplary conveyer drive for a trough assembly.
Figure 16:
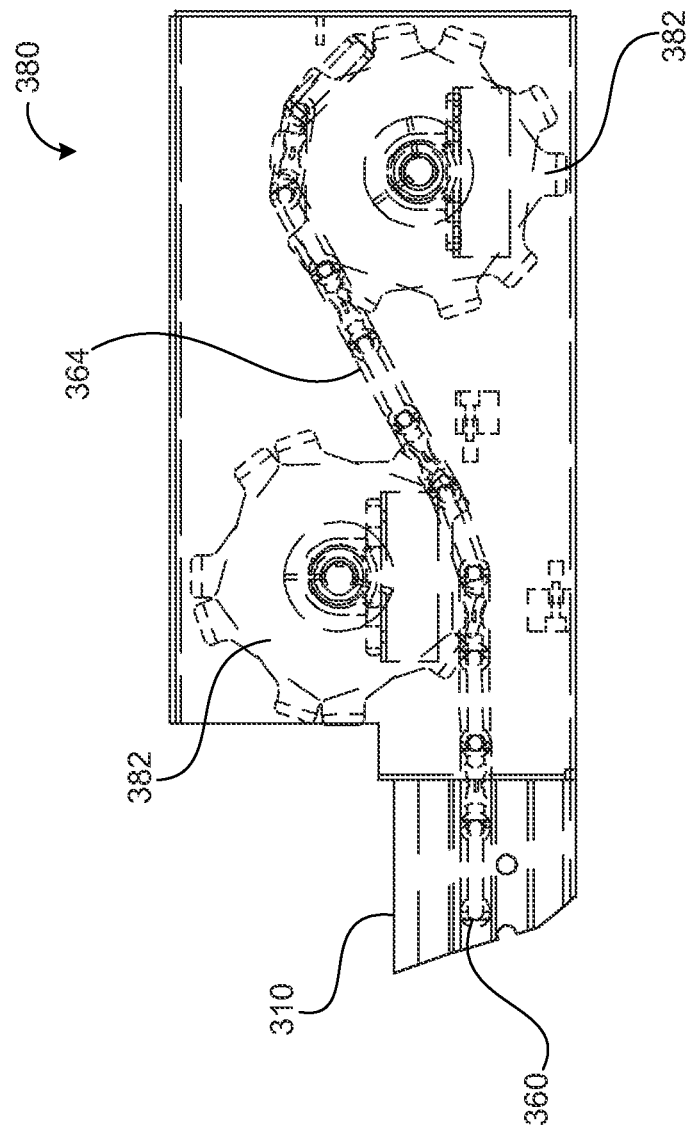
FIG. 16 is a side view of an exemplary conveyer idler for a trough assembly.

Referring to FIGS. 14-16, in some implementations, the trough assembly 300 includes a conveyer drive 370 and conveyer idler 380 disposed at opposite ends of the trough assembly 300 for driving and guiding the conveyer 360 to travel in a looped path from one end of the trough assembly 300 to another and back again. The conveyer 360 can be guided by the collection region 315 of the catch trough 310 and a first set of conveyer guides 338 of the elevator 330 to advance wash fluid 20 and/or debris 30 along one direction of the catch trough 310, to the evacuator 320, and up the elevator 330 for dumping and then returning in an opposite direction along a second set of conveyer guides 338 of the elevator 330 and through the return region 317 of the catch trough 310.

The conveyer drive 370 may include a gear or sprocket 372 received by the conveyer 360 and be driven by a coupled motor 374. The conveyer idler 380 may include one or more gears or sprockets 382 to guide the conveyer 360 around a return end of the system, such as the free end 313 of the catch trough 310. In the examples shown, the conveyer drive 370 is disposed near the elevator housing exit 336 at the dumping end 301 of the trough assembly 300 and the conveyer idler 380 is disposed near or at the free end 313 of the catch trough 310, with the conveyer 360 extending therebetween. In this example, the conveyer 350 moves wash fluid 20, debris 30, or a mixture thereof along the catch trough 310 to the evacuator 320, which evacuates fluid collected by the catch trough 310. By moving the wash fluid 20 and/or debris 30 to the evacuation end 311 of the catch trough 310, the conveyer 360 assists the user in maintaining a clear and/or clean wash pad 100. For example, without the conveyer 360, debris 30, such as gravel, may remain in the catch trough 310 after the washing operation and the user would have to shovel or otherwise remove the debris 30 form the catch trough 310 to avoid blockage of the catch trough 310 at some point. The conveyer 360 then proceeds to move any unevacuated fluid 20 and/or debris 30 up through the elevator housing 332 for dumping. While progressing up the elevator housing 332, unevacuated fluid may, under the force of gravity, fall away from the conveyer 360 and flow down the elevator housing 332 back to the evacuator 320 for evacuation. The conveyer 360 proceeds to move any remaining debris 30 (e.g., wet particulate and/or chunks) to the dump height $H_D$ for dumping.

In some implementations, the conveyer 360 is arranged to move any loose debris 30 off the debris collector 354 past the evacuator mouth 324 and up the elevator housing 332. Moreover, in some implementations, the conveyer 360 includes a perforated or mesh carrying surface 362 that allows fluid flow therethrough, such that the evacuator 320 aids fluid flow through the carrying surface 362 as the conveyer 360 passes thereover.

The wash pad 100 allows users to wash large items 10, including various sorts of commercial equipment, while collecting the wash fluid 20, separating debris 30, and dumping the separated debris 30 outside of the wash pad 10. The remaining wash fluid 20 can be received by a fluid treatment and recirculation system 340 that may further process the fluid to remove additional debris and/or contaminants and then deliver the treated fluid for reuse as wash fluid to wash any item(s) 10 on the platform 210.

Figure 17:
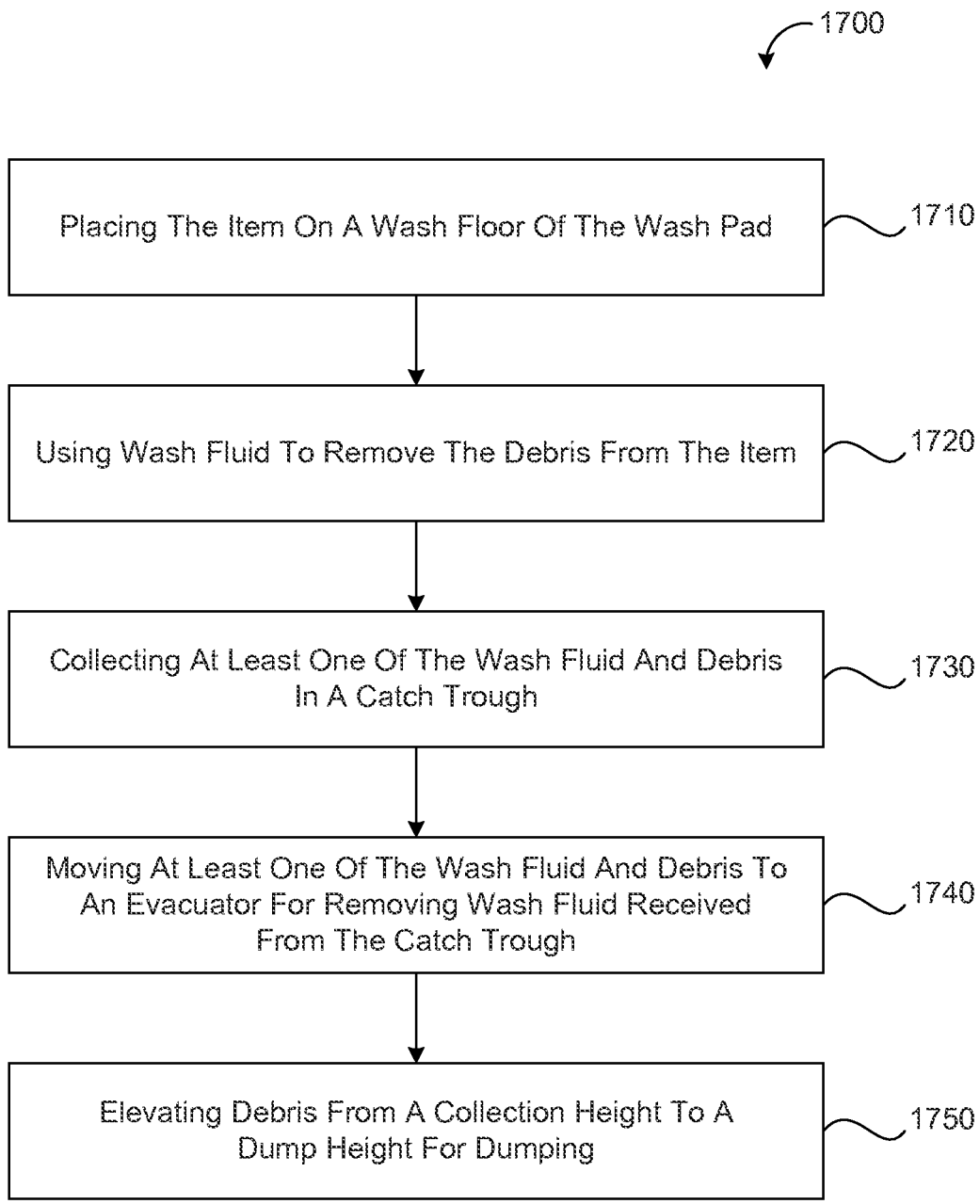
FIG. 17 is a schematic view of an exemplary arrangement of operations for washing a debris carrying item on a wash pad.

FIG. 17 provides an exemplary arrangement 1700 of operations for washing a debris carrying item 10 on a wash pad 100. The operations includes placing 1710 the item on a wash floor 212 of the wash pad 100, using 1720 wash fluid 20 to remove the debris 30 from the item 10, and collecting 1730 at least one of the wash fluid 20 and debris 30 in a catch trough 310 disposed in fluid communication with the wash floor 212. The method also includes moving 1740 at least one of the wash fluid 20 and debris 30 to an evacuator 320 disposed in fluid communication with the catch trough 310, and elevating 1750 debris 30 from a collection height $H_C$ to a dump height $H_D$ for dumping. The evacuator 320 substantially removes wash fluid 20 received from the catch trough 310.

In some implementations, the operations includes disposing the catch trough 310 in fluid communication with a longitudinal central portion 215 of the wash floor 210. The operations may include using a conveyer 360 disposed along the catch trough 310 and the elevator 320 for moving at least debris 30 along the catch trough 310 at the collection height $H_C$ and elevating the debris 30 to the dump height $H_D$ for dumping. The elevator 330 may include a housing 332 having an entrance 334 connected to the evacuator 320 and an exit 326 at the dump height $H_D$. The elevator housing 332 may also include conveyer guides 338 for guiding the conveyer 360 from the housing entrance 324 to the housing exit 326. In some examples, the operations includes arranging the elevator 330 to support the conveyer 360 at angle β of between about 10 degrees and about 90 degrees with respect to the catch trough 310. The operations may also include arranging the catch trough 310 to extend along an entire length of the wash pad 100. In some examples, the operations includes arranging the wash floor 212 to have at least one portion (e.g., channels 214 defined by the wash floor 212) inclined at an angle θ of between about 1 degree and about 60 degrees with respect to level ground. The wash floor 212 can be inclined to promote at least one of wash fluid 20 and debris 30 to move toward the catch trough. Nevertheless, the wash floor 212 may be arranged substantially level with respect to the ground as well.

The evacuator 320 may be arranged to be connected to one end 311 of the catch trough 310, and the catch trough 310 may be arranged to cause fluid flow towards the evacuator 320. In some implementations, the evacuator 320 includes an evacuator trough 350 defining an aperture 352 and having a fluid mover 326 disposed in fluid or pneumatic communication with the evacuator trough aperture 352. The fluid mover 326 draws wash fluid 20 though the evacuator trough aperture 352 for delivery to a wash fluid destination 340. In some implementations, the evacuator 320 relies on gravity, rather than a fluid mover 326, to draw wash fluid 20 though the evacuator trough aperture 352 for delivery to a wash fluid destination 340. The operations may include delivering the wash fluid 20 removed by the evacuator 320 to at least one of a fluid treatment system and fluid recirculation system. A debris collector 354 may be arranged over the evacuator trough aperture 352 for impeding or preventing the entrance of debris into the evacuator trough aperture 352. The operations may include moving the conveyer 360, which can be disposed along at least one of the catch trough 310 and the elevator 330 to move debris 30 collected on the evacuator 320 (e.g., on the debris collector 354 among other possible components) to the elevator 330. For example, the operations can include moving flight 362 of the conveyer 360 to scrape collected debris 300 off of the evacuator 320 and/or to move the scraped debris 30 to the dump height $H_D$ for dumping. The wash pad 100 may operate in a manner that allows cleaning of large vehicles or other objects, while collecting and disposing of washed off debris.

A number of implementations have been described. Nevertheless, it will be understood that various modifications may be made without departing from the spirit and scope of the disclosure. Accordingly, other implementations are within the scope of the following claims.

What is claimed is:

1. A wash pad comprising:
a wash floor for supporting a wash item;
a catch trough disposed in fluid communication with the wash floor, the catch trough collecting at least one of wash fluid and debris from the wash floor;
an evacuator disposed in fluid communication with an evacuation end of the catch trough, the evacuator substantially removing wash fluid received from the catch trough, the evacuator comprising:
a debris collector; and
a fluid mover in fluid communication with the debris collector for drawing fluid through the debris collector, the debris collector configured to collect non-fluid debris;
an elevator disposed in fluid communication with the evacuator, the elevator removing debris from the debris collector and elevating the removed debris from a collection height to a dump height for dumping; and
a conveyor disposed along the catch trough and the elevator, the conveyor moving at least one of the wash fluid and the debris collected in the catch trough to the evacuator and elevating the debris from the evacuator to the dump height.

2. The wash pad of claim 1, wherein the debris collector comprises a screen.

3. The wash pad of claim 2, wherein the screen is disposed substantially flush with a catch trough surface.

4. The wash pad of claim 1, wherein the conveyor includes conveyer flights that scrape collected debris off of the debris collector.

5. The wash pad of claim 4, wherein the conveyor flights move collected debris scraped from the debris collector to the dump height for dumping.

6. The wash pad of claim 1, further comprising a conveyer drive disposed at one of a dumping end of the elevator and a free end of the catch trough, a conveyer idler disposed at the other of the dumping end and the free end, the conveyer comprising a continuous loop arranged about the conveyer drive and the conveyer idler, the conveyer drive driving the conveyer to move debris collected along the catch trough along a first direction of the continuous loop over the evacuator and up the elevator to the dumping end for dumping, the conveyer returning in an opposite direction of the continuous loop to the free end of the catch trough.

7. The wash pad of claim 1, wherein the conveyer comprises a plurality of articulated sections.

8. The wash pad of claim 1, wherein the evacuator is connected to one end of the catch trough, the catch trough arranged to cause fluid flow towards the evacuator.

9. The wash pad of claim 1, wherein the catch trough extends along an entire length of the wash pad.

* * * * *